H. HICKMAN.
EGG TESTING DEVICE.
APPLICATION FILED SEPT. 11, 1916.

1,236,080.

Patented Aug. 7, 1917.

WITNESSES:

INVENTOR
Henry Hickman,
BY Strong & Townsend
ATTORNEYS ered with the openings 5. The lid is
UNITED STATES PATENT OFFICE.

HENRY HICKMAN, OF SAN FRANCISCO, CALIFORNIA.

EGG-TESTING DEVICE.

1,236,080.  Specification of Letters Patent.  Patented Aug. 7, 1917.

Application filed September 11, 1916. Serial No. 119,440.

*To all whom it may concern:*

Be it known that I, HENRY HICKMAN, a citizen of the United States, residing in the city and county of San Francisco and State of California, have invented new and useful Improvements in Egg-Testing Devices, of which the following is a specification.

This invention relates to an egg testing device.

The object of the present invention is to provide a simple compact easy and quickly operated device for testing or candling eggs and particularly a device which is adapted to be operated in the presence of the customer, or retailer, for their special protection against purchasing bad or unwholesome eggs, and also to demonstrate in the buyer's presence that the seller is in good faith and doing everything possible to comply with the pure food laws of the United States and such local ordinances as may exist.

Further objects will hereinafter appear.

The invention consists of the parts and the construction and combination of parts as hereinafter more fully described and claimed, having reference to the accompanying drawings in which:—

Figure 1:
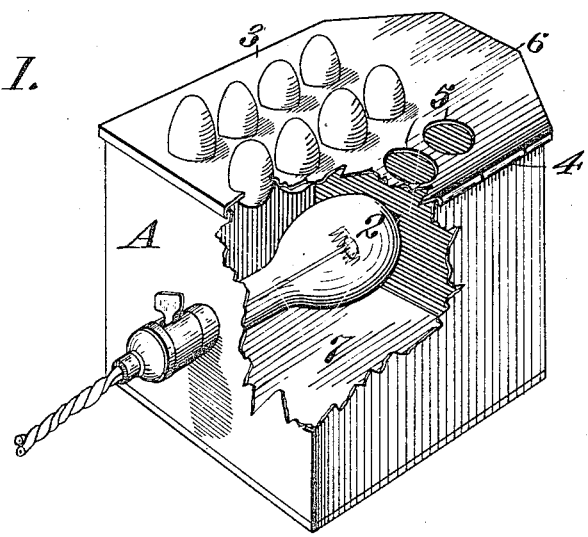
Figure 1 is a perspective view of the egg tester partly broken away.

Referring to the drawings in detail, A indicates a rectangular box which is of sufficient depth to permit the insertion of a one-hundred candle power electric light bulb such as indicated at 2.

Forming a covering for the box is a lid 3 which is secured to the box by means of hinges 4, and formed in said lid is a plurality of perforations 5 which are sufficiently large to receive the eggs to be tested.

Forming an extension on one end of the lid is a handle section 6, and placed in the bottom of the box is a mirror 7 which is provided for the purpose of reflecting and projecting the light upwardly through the openings 5 and the eggs placed therein.

The operation of the device will be as follows:—

Figure 2:
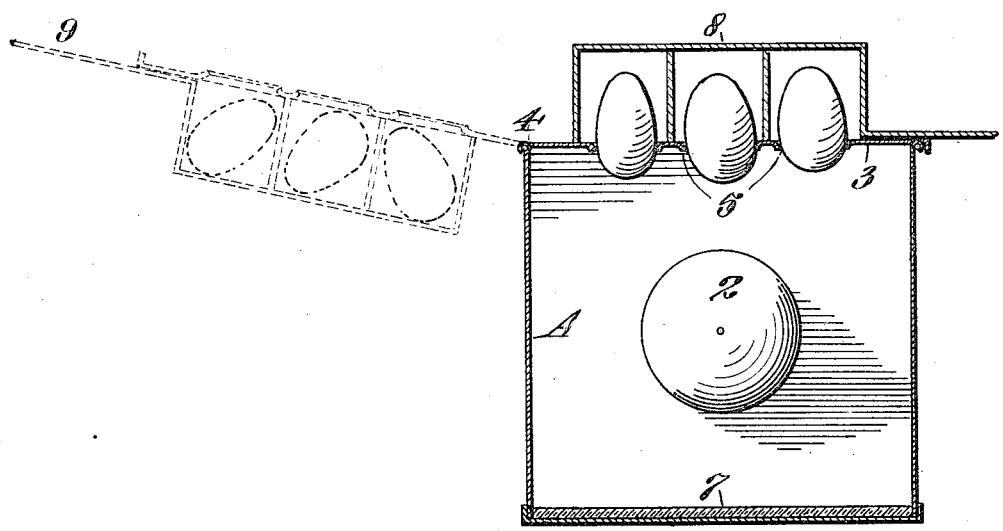
Fig. 2 is a cross section of same.

A carton preferably containing a dozen eggs such as indicated at 8 is first placed on the left hand and the lid turned to the dotted line position shown at 9. The carton is then moved until the eggs are registered with the openings 5. The lid is then closed to assume the position shown on Fig. 2, the carton removed, and the light turned on. The intensity of the light projected upwardly by the mirror 7 renders the eggs so transparent that any bad egg will immediately be detected by its dark color. To replace the eggs in a carton it is only necessary to place it on top of the lid over the eggs and to swing the lid by means of the handle extension 6 to the dotted line position where the eggs are again deposited into the carton. They are then ready for delivery and the quality of the eggs are positively insured.

The tester in the present instance is particularly constructed for use on the retail counter, and while a dozen perforations or openings 5 are provided, it is obvious that any number desired may be formed on the lid, and the box proper being correspondingly enlarged. The candling or testing device not only gives the purchaser an opportunity to inspect eggs and positively ascertain the quality before the purchase is made, but also serves the purpose of convincing the customer that the seller is doing everything possible to comply with the pure food laws of the United States, and any local ordinances which may exist.

The device as a whole is simple and compact in construction, is quickly and easily operated, and to this extent does not interfere with the time and general efficiency of the seller.

The extension forming the handle of the lid is preferably made in one piece with the lid, thus preventing the handle extension from becoming detached in operation and consequently reducing any risk of breaking or damaging the eggs when turning same into or out of the cartons.

The materials and finish of the several parts may otherwise be such as the experience and judgment of the manufacturer may dictate.

I wish it understood that various changes in form, proportions and minor details of construction may be resorted to within the scope of the appended claim, and that I do not wish to limit myself to the specific design or construction here shown.

Having thus described my invention, what I claim and desire to secure by Letters Patent is:—

An egg tester including a box, a source of light in the box, a top having perforations adapted to register with the respective compartments of an egg-containing carton, and means to hinge the top to the box to allow the top to be moved to a position to seat on the top of a carton held upright in a horizontal position to permit the top with the carton thereon to be swung to closed position to thereby invert said carton and to allow replacement of the eggs in the carton by inverting and seating the carton on the top and then moving the latter to horizontal open position.

In testimony whereof I have hereunto set my hand in the presence of two subscribing witnesses.

HENRY HICKMAN.

Witnesses:
JOHN H. HERRING,
FRANCES V. COLE.

Copies of this patent may be obtained for five cents each, by addressing the "Commissioner of Patents. Washington, D. C."